United States Patent Office 2,845,337
Patented July 29, 1958

2,845,337

METHOD OF ALTERING CRYSTALLIZING CHARACTERISTICS OF CALCIUM SULFATE

Clyde B. Myers, Painesville, Ohio, assignor to Diamond Alkali Company, Cleveland, Ohio, a corporation of Delaware No Drawing. Application July 31, 1952
Serial No. 302,001

6 Claims. (Cl. 23—300)

This invention relates to a method of altering the crystal habit and tendency for crystal over-growth of calcium sulfate crystallized from concentrated calcium chloride and sodium chloride brines containing a relatively small amount of sulfate ion with respect to such calcium chloride, and more particularly relates to a method of altering the crystal habit of calcium sulfate so as to decrease the tendency to form scale on surfaces in contact with calcium chloride brines containing a relatively small amount of such sulfate ion, and still more particularly relates to a method for controlling the scale formation in industrial pipe lines and other equipment through which sulfate-containing calcium chloride and sodium chloride brines are circulated in industrial chemical processes.

The tendency of calcium sulfate to form supersaturated solutions even in aqueous systems containing relatively high concentrations of calcium chloride is well known. Moreover, the tendency for crystal over-growth of calcium sulfate in hot concentrated calcium chloride brines containing a relatively small amount of sulfate ion is also well known.

It has been shown by experimentation that crystal over-growth of calcium sulfate is somewhat aggravated at temperatures above the transitional temperatures from the mono-hydrate of calcium sulfate to the anhydrous salt or "anhydrite."

In attempting to solve the problem of the tendency to crystal over-growth of calcium sulfate in calcium chloride brines, the prior art has dealt primarily with the suppression of sulfate ion concentration in the brines at such points in chemical process equipment as permit the precipitation of the calcium sulfate under conditions which do not promote the formation of hard and very adherent calcium sulfate scale. That it would be possible so to alter the crystal habit, and tendency for crystal over-growth, of calcium sulfate deposited from concentrated calcium chloride brines containing a relatively small amount of sulfate ion, and thereby lessen or prevent scale formation, has apparently not heretofore entered the thinking of those engaged in the solution of the problem.

It is one of the objects of the present invention to provide a method for so altering the crystal habit and tendency for crystal over-growth of calcium sulfate that industrial chemical plant equipment through which concentrated calcium chloride-containing brines are transported, may be used for extensive periods of time without the necessity of dismantling the equipment and mechanically removing deposited calcium sulfate scale therefrom.

Another object of the invention is to provide a method for so altering the crystal habit and tendency for crystal over-growth of calcium sulfate deposited from concentrated calcium chloride-containing brines present in the ammonia-soda process for the manufacture of sodium carbonate, that substantial increase of tonnage throughput of such brines is effected with concomitant substantial increase of production of sodium carbonate.

A further object is to increase the working life of ammonia stills in the ammonia-soda process to substantially greater periods of time, thus avoiding the necessity of uneconomically frequent dismantling of equipment and mechanical removal of strongly adherent calcium sulfate scale customarily formed therein.

These and other objects will appear to those skilled in the art from the description of the invention given hereinbelow.

Pursuant to these objects, the present invention is directed to a method of altering the crystal habit and tendency for crystal over-growth of calcium sulfate deposited from concentrated calcium chloride-containing brines, which brines contain, in addition, a relatively low concentration of sulfate ion. The method includes the steps of adding to a body of such brine a sodium salt of a hydrolyzate obtained by the alkaline hydrolysis of lignin sulfonic acid, said hydrolyzate having carboxyl groups and at least some residual sulfonic acid groups in the molecules thereof, and thereafter subjecting said brine to agitation.

In the practice of the method of the present invention, the hydrolyzate obtained by the alkaline hydrolysis of lignin sulfonic acid referred to hereinabove may be obtained by the alkaline hydrolysis of waste sulfite liquor from the sulfite pulping process employed in the manufacture of paper from wood. The hydrolyzate is normally obtained by treatment of the waste liquor to precipitate the calcium salts of the lignin sulfonic acid present in the waste liquor, displacing the calcium of the lignin sulfonic acid salts by treatment of the salts in alkaline media with carbon dioxide, or alkali metal carbonate, to precipitate calcium carbonate, and form sodium lignin sulfonate, after which the sodium lignin sulfonate is treated with aqueous alkali metal hydroxide, which may be potassium, sodium, lithium, rubidium, or cesium, but which is suitably and preferably sodium or caustic soda, to provide a pH above about 13; this mixture is heated at superatmospheric pressures (10–150 atmospheres) for a sufficient period of time to effect the hydrolysis of at least some of the sulfonic acid groups and methoxy-substituted aromatic groups present in the lignin residue of the waste sulfite liquor. These conditions may also effect carboxylation along the aliphatic chains of the lignin residues. However, such carboxylation may also be effected or augmented by the expedient of introducing air into the reaction mass during the hydrolysis of the lignin residue contained in the waste sulfite liquor.

From experimental evidence, it is believed that, apart from the function of hydroxyl groups in the lignin sulfonic acid hydrolyzates, the combination of the residual sulfonic acid groups and the carboxyl groups therein is the principal active factor of such hydrolyzates in altering the crystal habit and tendency for crystal over-growth of calcium sulfate in the environment to which the method of the present invention is directed.

The amount of the sodium salt of the hydrolyzate of lignin sulfonic acid as hereinabove described, used in the method of the present invention, is such as to give a final concentration in the concentrated calcium chloride-containing brine substantially within the range of 10–50 parts of said salt per million parts of brine, preferably substantially within the range of 15–30 parts per million. Following the addition of the salt of the hydrolyzate to the brine, the mixture is preferably agitated to disperse the salt uniformly therein.

The chloride salt concentration in the type of brines hereinabove referred to, i. e., concentrated calcium chloride-containing brines, normally is from 100–130 grams of calcium chloride per liter, with a total chloride ion concentration substantially within the range of 80–120 grams per liter, the difference between the amount of chloride necessary to satisfy the calcium chloride salt concentration being taken up as sodium chloride. The sulfate ion concentration in such brines normally is of the order of 0.9–1.8 grams per liter, this amount representing approximately the amount which would give a saturated solution of calcium sulfate in brines having the concentration of calcium chloride and sodium chloride as given hereinabove.

Where the method of the present invention is employed in conjunction with the ammonia-soda process for the manufacture of sodium carbonate from sodium chloride brines, the alkali metal, and suitably the sodium salt of the hydrolyzate of lignin sulfonic acid referred to hereinabove may be added to process liquors in the discharge line from the "pre-limer," wherein milk of lime (hydrated calcium oxide) is mixed with and reacted with ammonium chloride brine (ammonium chloride concentration substantially within the range of 130–160 g. p. l.) to evolve ammonia and form calcium chloride; subsequent to this addition, the effluent liquor from the "pre-limer" is passed through the "lime section" of the ammonia stills, in which section further quantities of ammonia formed by the reaction of calcium oxide with ammonium chloride are evolved from the calcium chloride-containing brine. As the brine passes through the lime section of the stills, it is progressively heated from about 75° to about 110° C. It is in this part of the ammonia-soda process wherein scaling of process equipment is extremely troublesome, although concentrated calcium chloride liquor lines leading from the bottom of the ammonia distiller are also subject to scaling by calcium sulfate over-growth resulting from heating the process liquors in the ammonia distiller.

Where the method of the present invention is employed in conjunction with a process for the production of magnesia from dolomite, by burning dolomite to a $CO_2$ content of the order of 2%, and reacting the CaO of the burned dolomite with aqueous ammonium chloride brine to evolve ammonia and form calcium chloride brine, the salt of the lignin sulfonic acid referred to above may be introduced into the discharge liquor from the reaction vessel in which the CaO and ammonium chloride are reacted, either at a point near the reaction vessel or at the point where the liquor is introduced into the lime section of an ammonia distiller, or at both points. By introducing the salt of lignin sulfonic acid into the discharge line near the reaction vessel, formation of calcium sulfate scale along the line is substantially completely inhibited, and scale is not present even after long periods of operation. The effect obtained by introducing the salt into the discharge liquor at both of the above-noted points is to give maximum protection against scale formation in both the discharge line and lime section of the distiller.

In order that those skilled in the art may better understand the method of the present invention and in what manner the same may be carried into effect, the following specific examples are offered:

*Example I*

In commercial apparatus for the reaction of burned dolomite (natural $CaCO_3$—$MgCO_3$, $CaCO_3$ at least 50 mol percent, burned to less than 5% $CO_2$) with ammonium chloride of an ammonium chloride brine (concentration 130–160 g. p. l.) to separate the calcium of the burned dolomite as calcium chloride, from magnesium (as magnesium oxide), the sodium salt of a hydrolyzate obtained by the alkaline hydrolysis of lignin sulfonic acid, having carboxyl groups and at least some residual sulfonic acid groups in the lignin residue thereof, is added to the discharge line from the reaction vessel in which the burned dolomite is reacted with ammonium chloride brine. The concentration of the sodium salt of the lignin sulfonic acid hydrolyzate is continuously maintained within the range of 15–30 parts per million. The brine solution containing the lignin sulfonic acid hydrolyzate (sodium salt) is passed through a 6-inch steel pipe line continuously for a period of 2 weeks. At the end of this period, it is found that, from the point of introduction of the reagent into the brine solution to the discharge end of the line, the line is clean to the metal.

Under substantially the same conditions, except that the addition of the sodium salt of the hydrolyzate of lignin sulfonic acid is omitted, it is found that this same pipe line, in a 2-week period, has a deposit of calcium sulfate scale averaging from 1.5" to 2" in depth over a distance of about 50 feet from the point of discharge from the reaction vessel. This amount of scale in the line requires that the line be dismantled and the scale removed before further production demands can be met. In contrast to the production capacity of this line, the line through which the calcium chloride brine containing the sodium salt of the hydrolyzate of the lignin sulfonic acid is passed, is effectively "on stream" for a period of up to 8 months without appreciable deposition of calcium sulfate scale.

*Example II*

The discharge of the pipe line described in Example I is fed to an ammonia distiller near the top of the lime section thereof, the temperature of the brine feed being of the order of 40°–45° C. Where the sodium salt of the hydrolyzate of lignin sulfonic acid is not added to the discharge line from the burned dolomite reactor, nor to the brine fed to the lime section of the ammonia distiller, a deposition of calcium sulfate scale at the bottom of the lime section attains a depth of 4" within a period of about 30 days. Such extensive deposition of calcium sulfate scale necessitates the shut-down of the still in order to remove the deposit of calcium sulfate scale before further production requirements at subsequent stages in the process can be met. In contrast to this condition, the addition of a sodium salt of the hydrolyzate of lignin sulfonic acid to the feed to the lime section of the ammonia distiller (calcium chloride brine as discharged from the reactor described in Example I above), so alters the tendency of calcium sulfate to form scale in this section of the still that after a period of 120 days, only 1.12" of scale are deposited upon the bottom plate of the lime section of the ammonia distiller.

From previous observations made on the above-described equipment, as to the rate of deposition of calcium sulfate scale under ordinary operation conditions and based upon the rate of scale deposition as noted above, it is estimated that this piece of equipment easily has a productive life without shut-down, due to scale formation, of not less than 180 days and in all probability, in excess of 200 days.

*Example III*

The sodium salt of a a hydrolyzate obtained by the alkaline hydrolysis of lignin sulfonic acid, having carboxyl groups and at least some residual sulfonic acid groups in the lignin residue thereof, is continuously added to the "pre-limer" section of an ammonia distiller of a commercial ammonia-soda process to provide a concentration of 20–45 parts of said salt per million parts of liquor discharged from the "pre-limer" to the "lime section" of the distiller. After 200 days' operation of the distiller, and upon shutting down for maintenance other than scale removal, examination of the bottom tray of the "lime section" shows negligible scale formation.

While there have been described various embodiments of the invention, the methods described are not intended to be understood as limiting the scope of the invention as it is realized that changes therewithin are possible and it is further intended that each element recited in any of the following claims is to be understood as referring to

What is claimed is:

1. The method of altering the crystal habit and tendency for crystal over-growth of calcium sulfate deposited from concentrated calcium chloride-containing brine having a relatively low concentration of sulfate ion, which includes the steps of adding to a body of such brine an alkali metal salt of a hydrolyzate obtained by the alkaline hydrolysis of lignin sulfonic acid, said hydrolyzate having carboxyl groups and at least some residual sulfonic acid groups in the molecules thereof, and subjecting said brine to agitation, following the addition thereto of said salt.

2. The method as claimed in claim 1 in which the alkali metal salt of said hydrolyzate is the sodium salt thereof.

3. The method of altering the crystal habit and tendency for crystal over-growth of calcium sulfate, thereby retarding the deposition of calcium sulfate scale deposited from concentrated calcium chloride-containing brine having a relatively low concentration of sulfate ion, which includes the steps of adding to a body of such brine a sodium salt of a hydrolyzate obtained by the alkaline hydrolysis of lignin sulfonic acid, said hydrolyzate having carboxyl groups and at least some residual sulfonic acid groups in the molecules thereof, the concentration of said sodium salt of said hydrolyzate falling substantially within the range of 10–50 parts of said salt per million parts of brine, and subjecting said brine to agitation, following the addition thereto of said salt.

4. The method of altering the crystal habit and tendency for crystal over-growth of calcium sulfate deposited from concentrated calcium chloride-containing brine having a relatively low concentration of sulfate ion, which includes the steps of forming a body of said brine by reaction of calcium oxide and ammonium chloride in aqueous solution, and subsequent to the reaction of said calcium oxide with said ammonium chloride, adding to said brine a sodium salt of a hydrolyzate obtained by the alkaline hydrolysis of lignin sulfonic acid, said hydrolyzate having carboxyl groups and at least some residual sulfonic acid groups in the molecules thereof, and subjecting said brine to agitation, following the addition thereto of said salt.

5. The method of altering the crystal habit and tendency for crystal over-growth of calcium sulfate deposited from concentrated calcium chloride-containing brine having a relatively low concentration of sulfate ion, which includes the steps of adding to a sulfate-containing ammonium chloride brine a sodium salt of a hydrolyzate obtained by the alkaline hydrolysis of lignin sulfonic acid, said hydrolyzate having carboxyl groups and at least some residual sulfonic acid groups in the molecules thereof, reacting the ammonium chloride of said ammonium chloride brine with lime to form ammonia and a calcium chloride brine containing said salt of said hydrolyzate, and heating and agitating said calcium chloride brine to evolve dissolved ammonia therefrom.

6. The method of altering the crystal habit and tendency for crystal over-growth of calcium sulfate deposited from concentrated calcium chloride-containing brine having a relatively low concentration of sulfate ion, which includes the steps of adding to a body of such brine a sodium salt of a hydrolyzate obtained by the alkaline hydrolysis of lignin sulfonic acid, said hydrolyzate having carboxyl groups and at least some residual sulfonic acid groups in the molecules thereof, the concentration of said salt in said brine falling substantially within the range of 10–50 parts of said salt per million parts of brine, heating the combination of said brine and said salt to a temperature above about 75° C., and agitating said mixture during the course of said heating.

References Cited in the file of this patent

UNITED STATES PATENTS

| | | |
|---|---|---|
| 1,839,124 | Seider | Dec. 29, 1931 |
| 1,999,709 | Terziev | Apr. 30, 1935 |
| 2,099,079 | Runscheidt | Nov. 16, 1937 |
| 2,576,386 | Bird | Nov. 27, 1951 |

FOREIGN PATENTS

| | | |
|---|---|---|
| 481,129 | Great Britain | Mar. 7, 1938 |

OTHER REFERENCES

Grove et al.: I. and E. Chem., vol. 43, No. 1, January 1951, pages 59 and 60.

Hackh: "Chemical Dictionary," third edition, 1944, published by the Blakiston Co., Philadelphia, page 788.

Grove et al.: "Industrial and Engineering Chemistry," vol. 41, No. 1, January 1949, pages 22 to 25.